(12) United States Patent
Keiper et al.

(10) Patent No.: US 7,850,323 B2
(45) Date of Patent: Dec. 14, 2010

(54) SANITARY FITTING WITH A LUMINOUS ACTUATING LEVER

(75) Inventors: Oliver Keiper, Aarbergen (DE); Michael Lehner, Gránichen (CH); André Leutwyler, Menziken (CH); Michael Lammel, Aachen (DE)

(73) Assignees: KWC AG, Unterkulm (CH); Schott AG, Mainz (DE)

( * ) Notice: Subject to any disclaimer, the term of this patent is extended or adjusted under 35 U.S.C. 154(b) by 513 days.

(21) Appl. No.: 12/071,033

(22) Filed: Feb. 14, 2008

(65) Prior Publication Data

US 2008/0202611 A1 Aug. 28, 2008

(30) Foreign Application Priority Data

Feb. 27, 2007 (EP) .................................. 07003949

(51) Int. Cl.
*F21V 33/00* (2006.01)
(52) U.S. Cl. .......................... 362/96; 362/555; 362/562; 137/560; 137/607; 239/18; 239/20
(58) Field of Classification Search .................... 362/96, 362/555, 562, 565; 137/560, 607; 239/18, 239/20
See application file for complete search history.

(56) References Cited

U.S. PATENT DOCUMENTS

| 5,351,347 | A | 10/1994 | Kunkel |
| 6,126,290 | A | 10/2000 | Veigel |
| 6,725,854 | B1 | 4/2004 | Afshari |
| 2006/0226250 | A1* | 10/2006 | Elliott et al. .................. 239/18 |

FOREIGN PATENT DOCUMENTS

| DE | 200 17 254 U1 | 4/2001 |
| DE | 100 42 722 A1 | 3/2002 |
| JP | A-11-247248 | 9/1999 |
| JP | A-2001-120448 | 5/2001 |
| JP | A-2001-123485 | 5/2001 |
| WO | WO 85/05167 A1 | 11/1985 |
| WO | WO 2006/018275 A1 | 2/2006 |
| WO | WO 2006/032336 A1 | 3/2006 |
| WO | WO 2006/094684 A1 | 9/2006 |

* cited by examiner

*Primary Examiner*—Stephen F Husar
(74) *Attorney, Agent, or Firm*—Oliff & Berridge, PLC

(57) ABSTRACT

A control cartridge (20) is inserted into the fitting housing (10). Mounted on the actuating shaft (38) of said cartridge is an actuating body (42) on which the tubular actuating lever (50) is fastened. A light guiding element (52) runs through the actuating lever (50). The light source (66) in the actuating body (42) emits light that is guided to the end of the actuating lever (50) by means of the light guiding element (52).

11 Claims, 5 Drawing Sheets

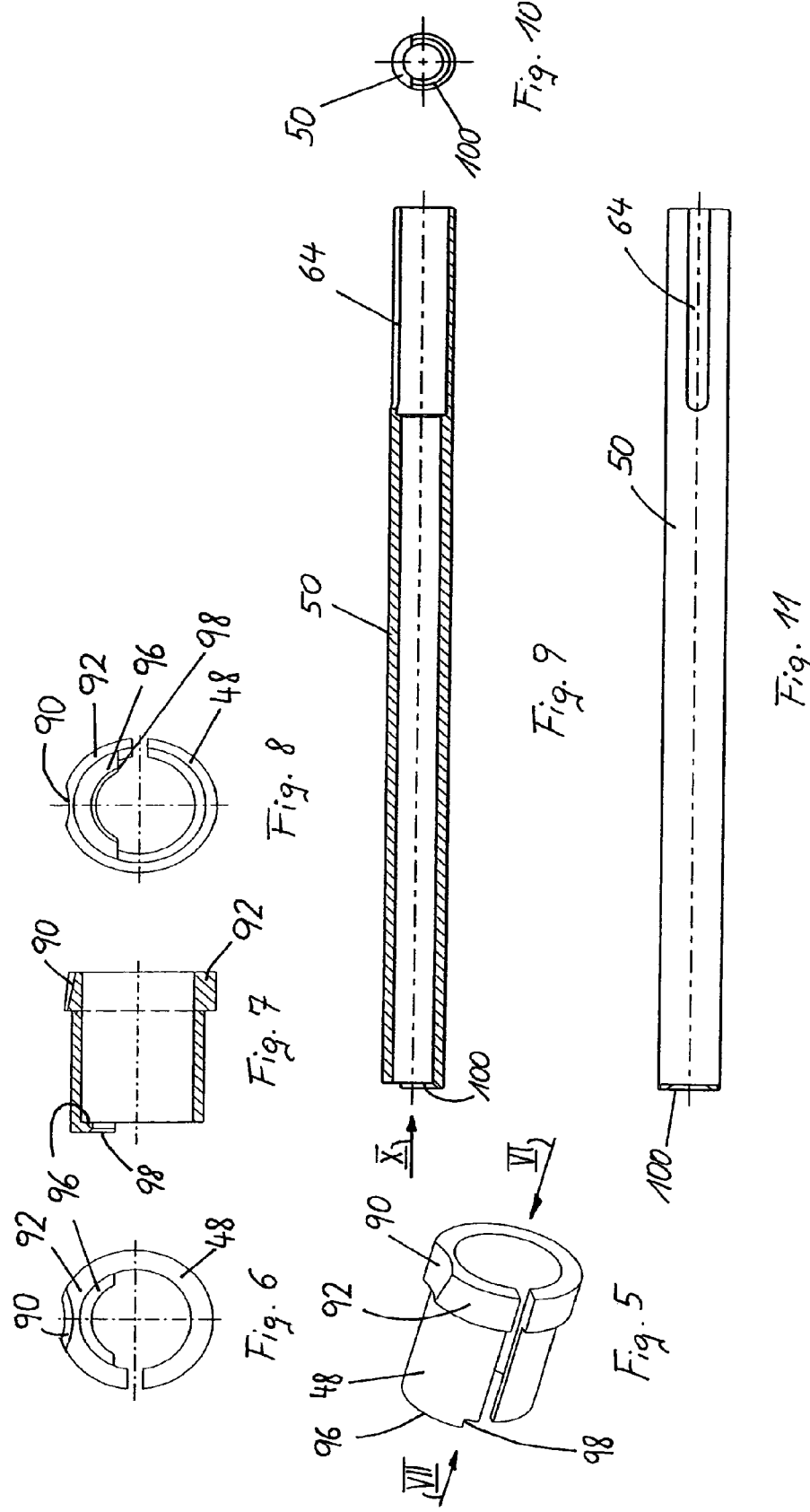

SANITARY FITTING WITH A LUMINOUS ACTUATING LEVER

The present invention relates to a sanitary fitting in accordance with the preamble of patent claim 1.

Such a sanitary fitting is disclosed, for example, in publication DE 100 42 722 A1. It has an adjusting element in the form of a lever. The latter has a centrally arranged receptacle which opens upward and in which a battery is located. The receptacle is provided with a cover in which light emitting diodes and signal diodes are arranged. The light emitting diodes output light and radiate in the process onto the user of the sanitary fitting from below. The signal diodes can be arranged in a row that is respectively assigned a specific service water temperature. The receptacle is of substantial size, in order to be able to receive the battery and the cover with the light emitting diodes.

It is an object of the present invention to create a generic sanitary fitting whose actuating lever can be illuminated even given small dimensioning.

This object is achieved with the aid of a sanitary fitting in accordance with patent claim 1. The location of the light source and the location where the light generated by said source emerges onto the surroundings are separated from one another. The light is guided to the light exit from the light source by means of a light guiding element. This enables a very slim design of the actuating lever.

Preferred embodiments of the inventive sanitary fitting are specified in the dependent patent claims.

The invention will be explained with the aid of an exemplary embodiment illustrated in the drawing in which, purely schematically:

FIG. 5 shows a perspective illustration of a collet chuck for holding an actuating lever of the sanitary fitting shown in FIGS. 1 to 4;

FIG. 6 shows the collet chuck in a view corresponding to the arrow VI of FIG. 5;

FIG. 7 shows a longitudinal section of the collet chuck;

FIG. 8 shows the collet chuck in a view in accordance with the arrow VIII of FIG. 5;

FIG. 9 shows the actuating lever in longitudinal section;

FIG. 10 shows the actuating lever in a view corresponding to the arrow X in FIG. 9; and FIG. 11 shows the actuating lever in plan view.

Figure 1:
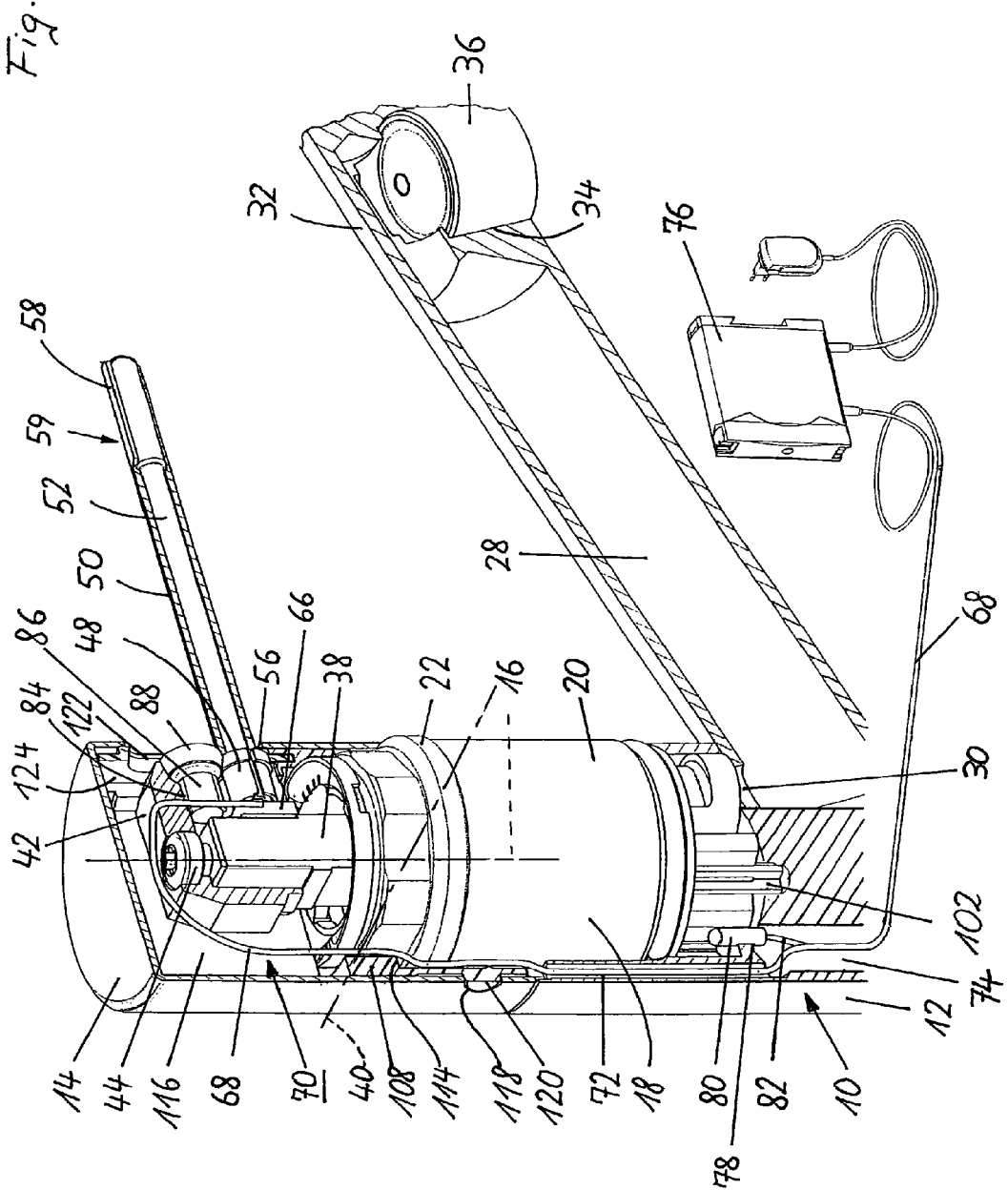
FIG. 1 shows a perspective view of a sanitary fitting that is partially sectioned.

The fitting shown in FIGS. 1 to 4 has a fitting housing 10 with an outer surface in the shape of a circular cylinder and which consists of a housing body 12, to be fastened on a wash bench, for example, and a covering hood 14. The latter is mounted on the housing body 14 such that it can rotate about a longitudinal axis 16 of the fitting housing 10.

On its upper side facing the covering hood 14, the housing body 12 has a receiving cutout 18 into which a control cartridge 20 is inserted in a known way and fastened by means of an annular screw 22. A cold water inlet 24 and a warm water inlet 26 run in a known way through the housing body 12 to the receiving cutout 18 and to the relevant inlet openings of the control cartridge 20; see FIG. 2. Furthermore, leading away from the receiving cutout 18 is a water outlet 28 that consists of a blind outlet bore 30 running away downward from the base of the receiving cutout 18, and of an outlet tube 32, which is connected to said bore in terms of flow and is fastened in the housing body 12 and projects obliquely upward therefrom in a radial direction. In its free end region, the outlet tube 32 has an outlet opening 34 with a mouthpiece, for example a jet regulator, inserted therein. The water outlet 28 is connected in a known way to a mixed water exit opening of the control cartridge 20.

In the upward direction, an actuating shaft 38 of square cross section in the present example projects over the housing of the control cartridge 20. The actuating shaft 38 can be pivoted on the one hand about the longitudinal axis 16 and, on the other hand, about a transverse axis 40 crossing said first axis and at right angles thereto; see FIG. 1. It is possible in a known way for the temperature of the service water to be set by pivoting about the longitudinal axis 16, and for the water throughflow to be set by pivoting about the transverse axis 40. If, in the case of the control cartridge 20 shown, the actuating shaft 38 extends in the direction of the longitudinal axis 16, the water throughflow is interrupted; this is shown in FIGS. 1 to 4. Pivoting the actuating shaft 38 in a fashion starting from this end position about the transverse axis 40 up to the other end position, indicated by the line 38 in FIG. 2, increases the water throughflow continuously up to a maximum. The actuating shaft 38 can also be pivoted about the longitudinal axis 16 in a limited angular range. If it is rotated to one end of this angular range, only cold water flows through the fitting, while at the other end of the angular range only warm water flows, and the temperature of the service water can be set by means of intermediate positions.

An actuating body 42 is plugged in a rotationally secure fashion on the actuating shaft 38 and fastened thereon by means of a screw 44. The actuating body 42 has a receiving opening 46 that is in the shape of a circular cylinder and runs perpendicular to the actuating shaft 38. Inserted into the latter is a sleeve-shaped collet chuck 48 that is penetrated by a tubular actuating lever 50. Located in the thin walled actuating lever 50, which is of rectilinear design and consists of chrome steel in the present case, is a rod-type light guiding element 52. The latter terminates at the end of the actuating lever 50 on the side of the actuating body, and has there a light entrance surface 54 at the end face. The actuating lever 50 projects outward in a radial direction from the actuating body 42 in a fashion penetrating a slot 56 in the covering hood 14, and at the free end of the actuating lever 50 the light guiding element 52 has a light exit region 58. The light exit region 58 arranged at the exit 59 from the actuating lever 50 consists, on the one hand, of the side of the end face of the light guiding element 52 which is aligned with the end of the slim, tubular actuating lever 50 and, on the other hand, of a band-shaped exit surface region 62 lying on top in a slot-shaped opening 64, running from the free end, of the actuating lever 50. The slot-shaped opening 64 is penetrated by a boss-type projection of the light guiding element 52 in such a way that the light exit region 58 is aligned with the external surface of the actuating lever 59.

The light source 66, preferably consisting of a single LED, is received in a cutout of the housing body 12 that is open downward. The axis of the light source 66 is aligned with the light guiding element 52, and the light source 66 is intended for coupling emitted light into the light guiding element 52 at the light entrance surface 54. The light source 66 is preferably arranged very near the light entrance surface 54.

A flexible electrical feed line 68 runs, starting from the light source 66, through a groove-shaped cutout in the housing body 12 in an upward direction, and, in an unobstructed space 70 delimited by the actuating body 42 and the covering hood 14, from the upper end of the housing body 12 in an arc to the rear side, opposite the water outlet 28, of the fitting housing 10, in a gap there, between the covering hood 14 and the screw 22 or control cartridge 20, in a downward direction and then through a tubular guide 72 of the housing body 12 into a downwardly open blind guide cutout 74, of larger cross section, and through the latter to a feed unit 76 (see FIG. 1). The unobstructed space 70 enables the feed line 68 and the actuating body 42 to be moved without conflict during pivoting of the actuating shaft 38 by means of the actuating lever 50.

A bore 78 runs from the base of the blind guide cutout 74 into the receiving cutout 18. Tightly fastened in the bore 78 is a temperature sensor 80 that is intended for measuring the temperature of the service water leaving the control cartridge 20 and flowing through the water outlet 28, on the one hand, and for outputting a corresponding signal to the feed unit 76 via a sensor line 82, on the other hand.

In the exemplary embodiment shown, the feed unit 76 is fed with 220 volts, for example, from the electricity grid via a transformer, and has a control unit. Via the feed line 68, the latter drives the light source 66 with the aid of signals, differing as a function of the service water temperature measured by means of the temperature sensor 80, in such a way that the light source 66 generates light in various colors as a function of the temperature of the service water: by way of example, blue for cold water, violet for mixed water and red for warm water.

The fastening of the actuating lever 50 on the actuating body 42 can best be explained with the aid of FIGS. 4 to 11. In the direction of the longitudinal axis 16, above the receiving cutout 46, the actuating body 42 has a threaded hole 84 whose axis runs parallel to the axis of the receiving cutout 46, and thus parallel to the actuating lever 50. Screwed into the threaded hole 84 is a fastening screw 86 with a conical head 88 that tapers conically in the direction of the screw shank.

The conical head 88 of the fastening screw 86 is intended for the purpose of engaging in an engagement cutout 90, shaped in diametrically opposed fashion, in a boss running round radially on the outside, of the collet chuck 48. The cooperation between the head 88 of the fastening screw 86 and the engagement cutout 90 on the one hand fixes the rotary position of the collet chuck 48, and on the other hand the latter is held in an axial direction by the boss 92 being pressed against a stop 94 of the actuating body 42. As a third function, the collet chuck 48, slotted in a longitudinal direction, is contracted in a radial direction by means of the head 88 of the fastening screw 86, and this leads to a secure fastening of the actuating lever 50 in the collet chuck 48.

Moreover, at its end averted from the boss 92 and facing the light source 66, the collet chuck 48 has a stop region 96 that extends in a circumferential direction, in the top lying region of the collet chuck 48, above a part of the sleeve-like collet chuck 48, and projects arcuately inward in a radial direction. On the one hand, the stop region 96 forms an axial stop for the actuating lever 50, and thereby fixes the light entry surface 54 of the light guiding element 52 arranged permanently in the actuating lever 50, while on the other hand it forms a stop for the rotational lock 98 of the actuating lever 50. As is to be gathered from FIGS. 9 to 11, in particular, on this side the actuating lever 50 has a rotationally locking projection 100 whose ends, seen in the circumferential direction, cooperate with the relevant ends of the stop region 96 of the collet chuck 48. The unique rotary position of the actuating lever 50 is specified by this rotational lock 98, on the one hand, and by the cooperation of the fastening screw 86 with the collet chuck 48, on the other hand, such that the slot-shaped opening 64 lies at the top.

The actuating lever 50 penetrates the slot 56 of the covering hood 14, this slot 56 running parallel to the longitudinal axis 16 and being delimited by the covering hood 14 both below and above. An exceptionally simple assembly is ensured by the fact that the receiving cutout 46 and the threaded hole 84 are arranged in a mutually axially parallel fashion and next to one another in the longitudinal direction of the slot 56. After the control cartridge 20 is inserted in the correct rotary position—this is ensured by pins 102 that project from the control cartridge 20 and engage in corresponding positional holes in the housing body 12—and is fastened by means of the screw 22, the actuating body 42 equipped with the light source 66 is plugged onto the fastening shaft 38 and fastened by means of the screw 44. The feed line 68 is guided through the guide 72 and the guide cutout 74 and connected to the feed unit 76.

The collet chuck 48 is already inserted into the actuating body 42 in a correct rotary position and held in its position by means of the fastening screw 86, which is lightly screwed in. Subsequently, the covering hood 14 is pushed over an upper end region of the housing body 12 in such a way that the slot 56 comes to lie at the receiving cutout 18 and the fastening screw 86. It is now possible for the actuating lever 50 to be plugged in the correct rotary position through the slot 56 into the collet chuck 48 and be pushed forward up to the stop region 96. Subsequently, the fastening screw 86 is screwed tight by means of a screwdriver through the slot 56.

Dismantling is possible in a simple way in reverse sequence.

Figure 3:
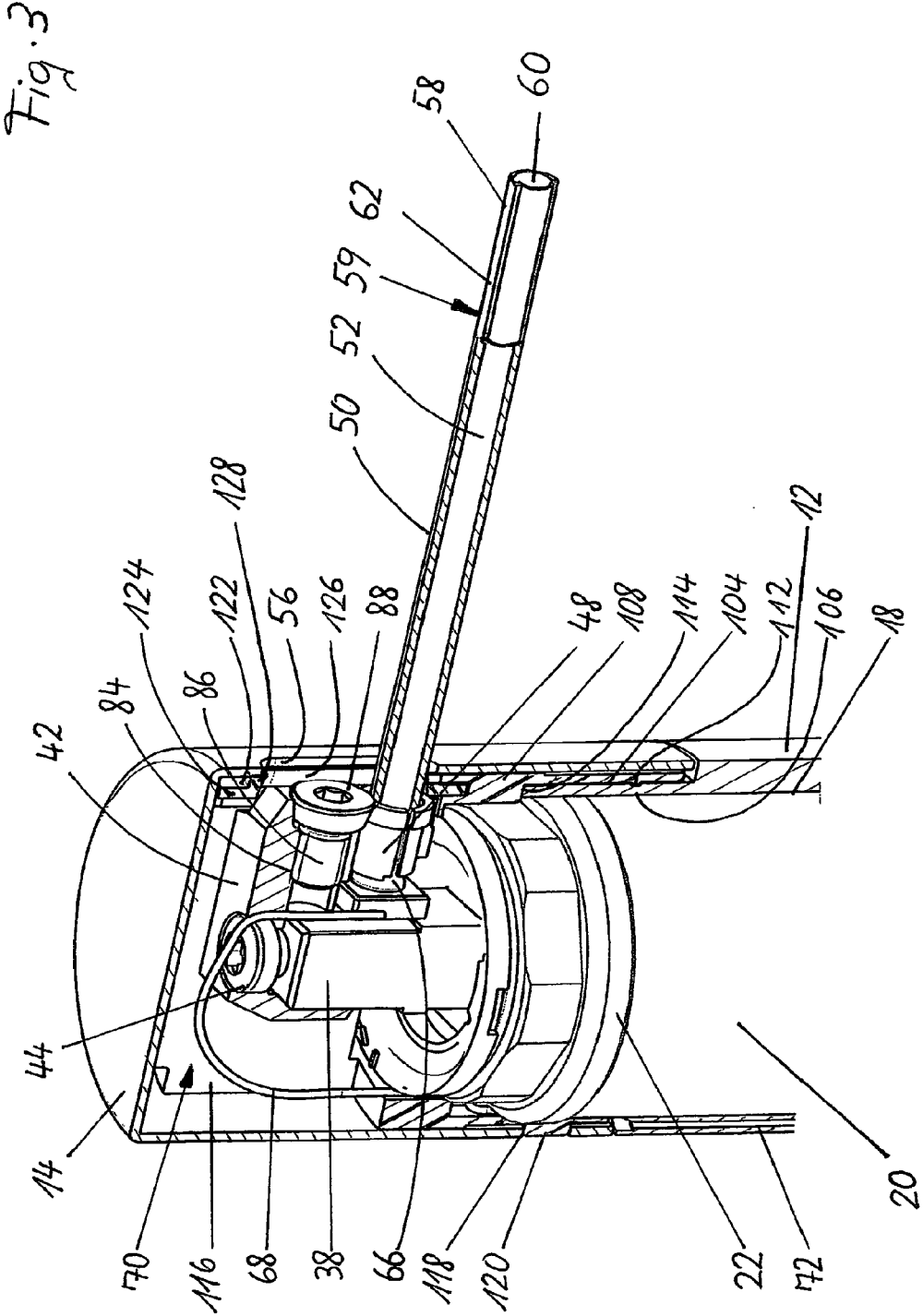
FIG. 3 shows a perspective illustration of, partially sectioned, an upper end region of the sanitary fitting in accordance with FIGS. 1 and 2.
Figure 4:
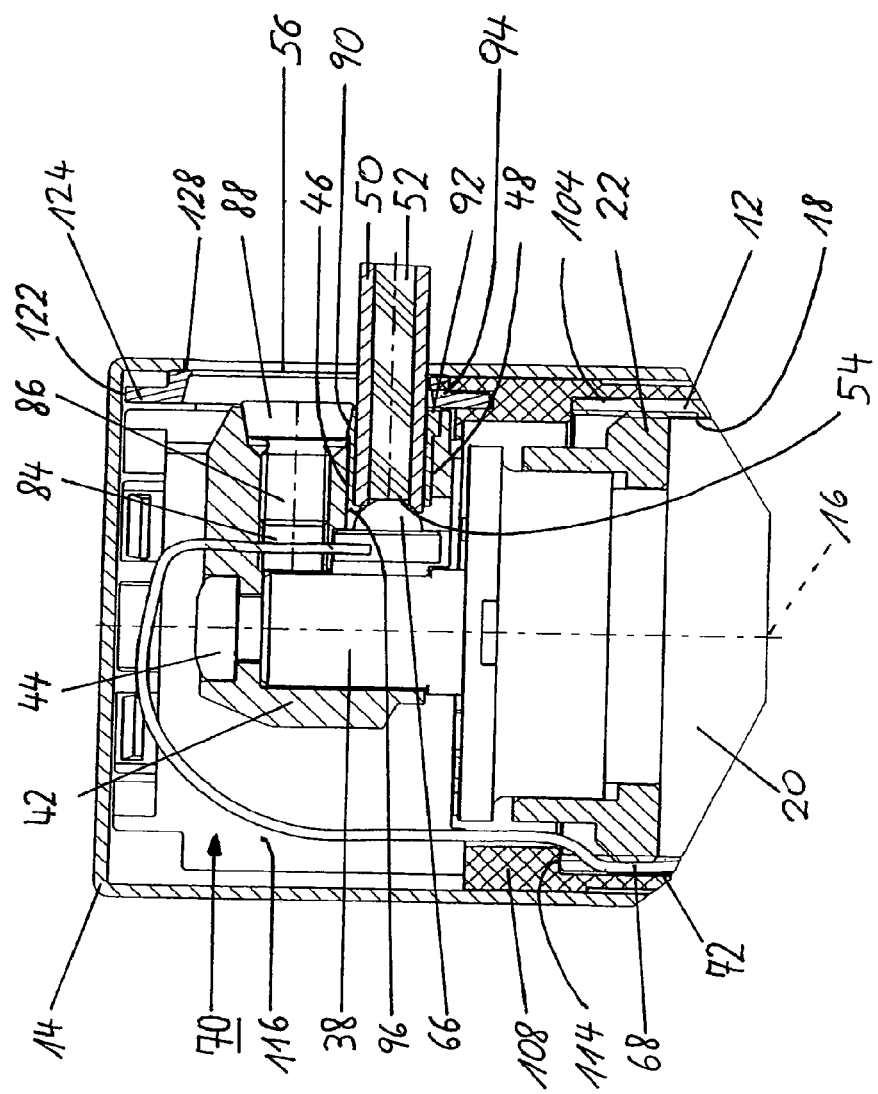
FIG. 4 shows the upper part of the sanitary fitting in longitudinal section enlarged by comparison with FIG. 2.

In its upper end region 104, the housing body 12 has a reduced outside diameter as well as a groove 106 running in a circumferential direction; see FIG. 3. A plastic cap is inserted into the covering hood 14, for example made from chrome steel. On the circumferential side, the sleeve-shaped plastic cap 108 bears against the upper end region 104 of the housing body 12, and engages in the groove 106 with a holding boss 112 running in a circumferential direction. On the one hand, the connection 112, 106 between holding boss and groove secures the covering hood 14 in an axial direction, but on the other hand it forms a rotational limitation for the covering hood 14 in a circumferential direction in that the groove 106 is designed to be restricted in a circumferential direction, and the holding boss 112 is designed to be correspondingly shorter in a circumferential direction. Moreover, the plastic cap 108 has a stop shoulder 114 that projects radially inward and with the aid of which it is supported at the upper end of the housing body 12 and thereby prevents damage in the case when a very strong force acts on the covering hood 14. Furthermore, the plastic cap 108 has two wall parts 116 that receive the actuating body 42 between them with play.

The covering hood 14 is of beaker-type design and covers the plastic cap 108 completely in such a way that only a narrow circumferential gap remains between the lower end of the covering hood 14 and the housing shoulder delimiting the upper end region 104. Since the two wall parts 116 are spaced apart from one another, only the covering hood 14 need be provided with the slot 56. On the side lying diametrically opposite the slot 56, the covering hood 14 has a circular holding opening 118 that is continuous in a radial direction and in which a holding pin 120 of the plastic cap 108 engages. Before the assembly of the covering hood 14 on the housing body 12, the plastic cap 108 is preassembled by being introduced into the covering hood 14 while the holding pin 120 is pressed back elastically, until the holding pin 120 springs into the holding opening 118.

An elastomeric sealing element 122 is provided at the stop 56 on the inside of the covering hood 14. Said sealing element has a plate-like, rectangular base part 124 with a longitudinal slot 126 corresponding to the slot 56 of the covering hood 14. Projecting from the base part 124 is an inherently closed sealing lip 128 that runs around the longitudinal slot 126, bears against the covering hood 14 and approximately closes the slot 56 of the covering hood 14 outside the region of the actuating lever 50. This forms a protection against the ingress of foreign particles into the interior of the fitting housing 10. The base part 124 is held laterally in corresponding cutouts in the wall parts 116 of the plastic cap 108.

Figure 2:
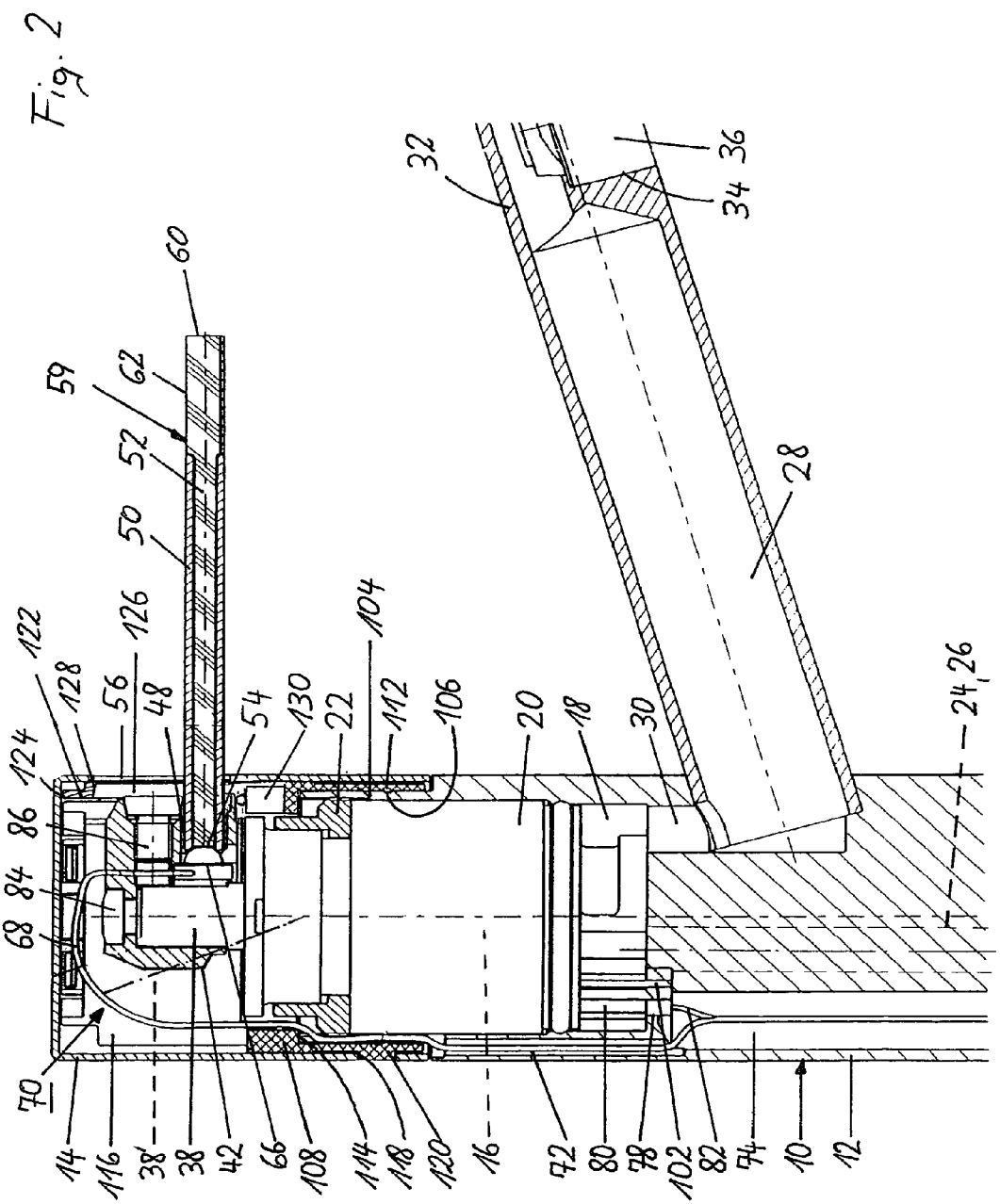
FIG. 2 shows a longitudinal section of the sanitary fitting in accordance with FIG. 1, here, as well, a control cartridge being illustrated unsectioned.

FIG. 2 shows a microswitch 130 that is fastened on the plastic cap 108 below the slot 56, and with which the actuating body 42 cooperates. A signal line to the feed unit 76 runs from the microswitch 130 into the space 70 and from there parallel to the feed line 68. It may be detected by means of the microswitch 130 when the actuating lever 50 is located in its lower end position, and thus the flow of water through the sanitary fitting is prevented. The signal of the microswitch 130 can serve different purposes. Thus, it is possible with the control cartridge 20 closed for the control unit 76 not to drive the light source 66, and so for the actuating lever 50 not to be illuminated. It is also conceivable to keep the feed unit 6 in an energy saving standby mode with closed control cartridge 20. It is also possible to drive the light source 66 in a different way with closed control cartridge 20 such that, for example, it flashes or outputs light in a different color.

Instead of the microswitch 130, it is also possible for a different type of sensor to be present. The latter, or the microswitch, could also cooperate with the actuating lever 50 itself, the collet chuck 48 or the actuating shaft 38. It is also conceivable to dispense with the microswitch 130 or a corresponding sensor in the case when permanent illumination of the actuating lever 50 is desired.

It is also possible to dispense with the temperature sensor 80 in the case when an illumination independent of the temperature of the service water is desired.

Of course, it is also conceivable to use control cartridges 20 whose actuating shaft 38 can be pivoted only about the longitudinal axis 16 or the transverse axis 40.

In the case of the exemplary embodiment shown, the actuating lever 50 is designed to be rectilinear and very slim. Of course, it is possible also to design the actuating lever 50 to be solid and, if appropriate, curved. Moreover, different possibilities exist for designing the light exit region 58.

The invention claimed is:

1. A sanitary fitting comprising a control cartridge that is arranged in a fitting housing and is connected to a water inlet and a water outlet, an actuating lever for actuating the control cartridge, and at least one light source, wherein arranged in the actuating lever is a light guiding element, the light guiding element has a light exit region at an exit from the actuating lever and a light entrance surface at the other end, and the light source arranged in the interior of the fitting housing is intended for feeding light into the light guiding element at the light entrance surface.

2. The sanitary fitting as claimed in claim 1, wherein the actuating lever is of tube-type design and the light exit region is arranged in a free end region of the actuating lever.

3. The sanitary fitting as claimed in claim 1, wherein the control cartridge has an actuating shaft that can pivot at least about an axis, and there is fastened on the actuating shaft an actuating body from which the actuating lever projects, and which carries the light source.

4. The sanitary fitting as claimed in claim 3, wherein the actuating body has a receiving opening for the actuating lever and, at least approximately parallel thereto, a threaded hole for a fastening screw for the actuating lever.

5. The sanitary fitting as claimed in claim 4, wherein arranged in the receiving opening is a collet chuck that is at least partially penetrated by the actuating lever and with which a preferably conically designed head of the fastening screw cooperates.

6. The sanitary fitting as claimed in claim 5, wherein the collet chuck has a cutout cooperating with the clamping screw in order to hold the collet chuck in a defined rotary position, and wherein a rotational lock acts between the collet chuck and the actuating lever in order to permit only one reciprocal rotary position.

7. The sanitary fitting as claimed in claim 4, wherein the actuating lever penetrates a slot of a covering hood, and the actuating lever and the fastening screw are arranged next to one another in the longitudinal direction of the slot in such a way that the fastening screw can be actuated through the slot.

8. The sanitary fitting as claimed in claim 1, wherein a sensor or switch cooperates with the actuating lever or, if appropriate, with the actuating body or actuating shaft.

9. The sanitary fitting as claimed in claim 1, wherein the control cartridge is designed as a mixer cartridge connected to a cold water and a warm water inlet and to the water outlet, a temperature sensor for the service water is connected to a feed unit, and the latter drives the light source in such a way that the light source generates light of a different color as a function of the measured temperature.

10. The sanitary fitting as claimed in claim 9, wherein the actuating shaft can be pivoted about a longitudinal axis of the control cartridge and a transverse axis running perpendicular thereto.

11. The sanitary fitting as claimed in claim 1, wherein a flexible feed line for the light source runs in a guide of the fitting housing, and in an unobstructed space in a region between the guide and the light source.

* * * * *